Oct. 31, 1961        M. GONDOUIN        3,007,107

WELL LOGGING APPARATUS

Original Filed May 10, 1956        3 Sheets-Sheet 1

*INVENTOR.*
MICHEL GONDOUIN
BY William R. Sherman
HIS ATTORNEY

Oct. 31, 1961 M. GONDOUIN 3,007,107
WELL LOGGING APPARATUS
Original Filed May 10, 1956 3 Sheets-Sheet 2

INVENTOR.
MICHEL GONDOUIN
BY William R. Sherman
HIS ATTORNEY

Oct. 31, 1961    M. GONDOUIN    3,007,107
WELL LOGGING APPARATUS
Original Filed May 10, 1956    3 Sheets-Sheet 3
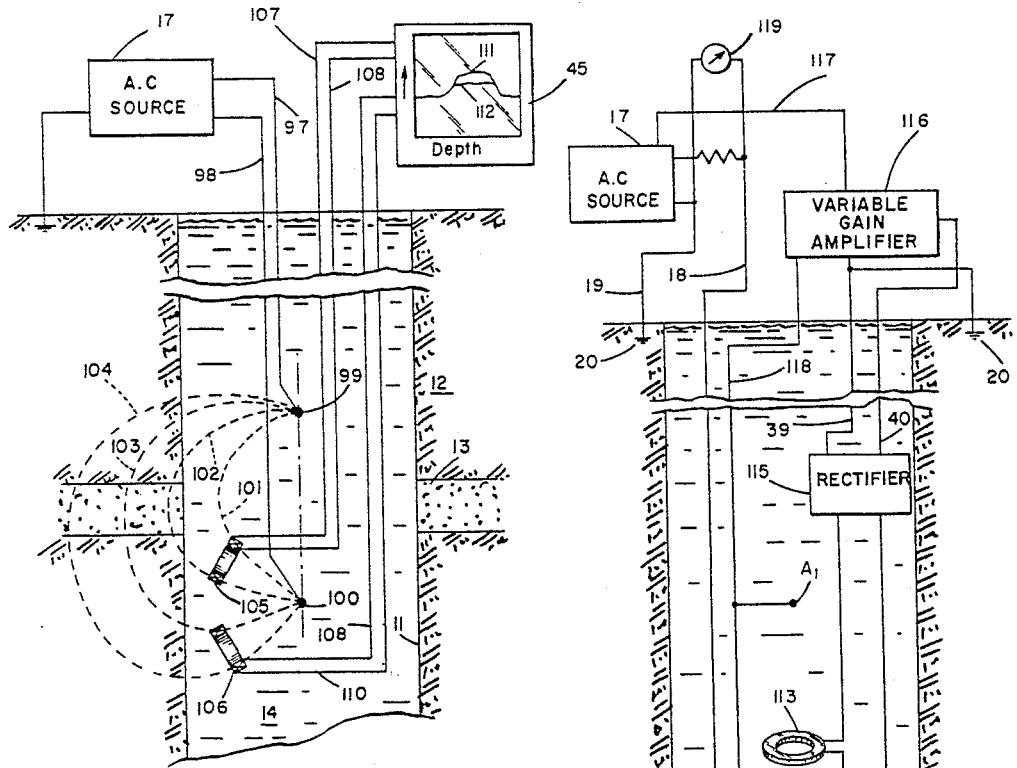
FIG.7
FIG.8
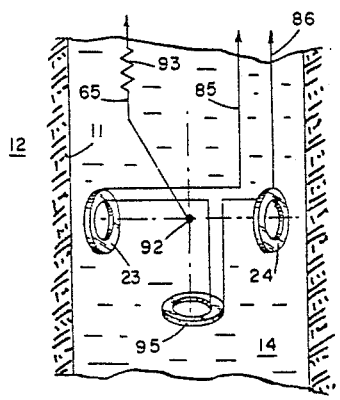
FIG.6
INVENTOR.
MICHEL GONDOUIN
BY *William P. Sherman*
HIS ATTORNEY

United States Patent Office 3,007,107
Patented Oct. 31, 1961

3,007,107
WELL LOGGING APPARATUS
Michel Gondouin, Ridgefield, Conn., assignor to Schlumberger Well Surveying Corporation, Houston, Tex., a corporation of Texas
Continuation of application Ser. No. 583,977, May 10, 1956. This application Jan. 8, 1959, Ser. No. 785,994
20 Claims. (Cl. 324—1)

This invention relates to well logging systems and more particularly to apparatus for deriving signals representing the conductivity or resistivity of earth formations traversed by a borehole.

This application is a continuation of applicant's copending application Serial No. 583,977, for "Well Logging Apparatus," filed May 10, 1956, and now abandoned.

To locate oil-bearing strata and to derive other information useful in the recovery of hydrocarbons from earth formations, wide spread use is made of electrical well logging systems employing electrode arrays lowered into boreholes to obtain indications of formation resistivity. These electrode arrays generally include at least one electrode for emitting survey current into adjacent formations and one or more potential measuring electrodes for detecting potential differences produced by passage of the survey current. The total survey current emitted from the survey current electrode is either known or is regulated so that signals representing formation resistivity may be derived from potentials detected at the measuring electrodes.

In instances where indications of formation conductivity are desired, a measurement of the total survey current may be made while maintaining the potential of the emitting electrode constant. In other instances, the derivation of accurate resistivity indications requires that flow of survey current along the borehole from the emitting electrode be detected and overcome. By spacing potential pick-up points along the borehole, as taught in Doll Patent No. 2,712,627, such flow along the borehole may be detected as a potential difference produced between the points, this potential difference being used to control flow of an opposing current.

It is an object of the present invention to provide novel and effective well logging apparatus for deriving signals representing electrical properties such as the conductivity or resistivity of earth formations.

Another object of this invention is to provide such apparatus in which formation conductivities or resistivities represented by the derived signals are given a desired significance by a selective measurement of current emitted from an electrode.

A further object of the invention is to provide such apparatus by which detailed logs of formation conductivity may be secured having a desired significance.

Yet another object of the invention is to provide apparatus of the foregoing character which produce logs from which the dip of earth formations may be determined.

Still another object of the invention is to provide novel and effective well logging apparatus whereby detailed and accurate indications of formation resistivity at a distance beyond the borehole wall may be secured.

These and other objects are attained, in accordance with the invention, by emitting current from an electrode which is lowered into a borehole and detecting that portion of the emitted current which passes through the passage of at least one toroidal coil. Such passage is spaced from a surface of the electrode in contact with conductive fluid and contains conductive fluid to provide a path for the selected portion of current.

In one embodiment of the invention, a toroidal coil is spaced from an elongated electrode with its plane parallel to the axis of the electrode to detect ionic current in a beam extending transversely of the borehole wall. In another embodiment of the invention, at least three toroidal coils are spaced angularly about an elongated electrode to detect the magnitude of radial current beams for determinations of formation dip. In another form, toroidal coils are spaced about an electrode at different angles from the vertical so that the difference in conductivities as are encountered by ionic current beams passing through the respective toroidal coils may be determined. By detecting the difference in current components flowing along and laterally of the borehole from an electrode in another form of the invention, indications significant of formation resistivity laterally of the electrode are derived. In still another form, a pair of toroidal coils are spaced above and below a main electrode with their planes transverse to the borehole to detect ionic current flow longitudinally of the borehole. Spaced above and below the toroidal coils are auxiliary electrodes from which auxiliary current is emitted in response to the detected ionic current flow with a magnitude and phase substantially to nullify the flow of ionic current through the toroidal coils. In this manner, a radial beam of ionic current from the main electrode is maintained. In yet another form of the invention, an electrode having an appreciable effective area is urged into proximity with the borehole wall for electrical contact therewith and ionic current flow from a central portion of the electrode is detected.

The invention will be better understood from the following detailed description taken in conjunction with the accompanying drawings, in which:

FIG. 6 is a diagrammatic representation of an electrode and coil array which may be used in lieu of the electrode and coil assembly of FIG. 5 to obtain indications of different significance;

FIG. 7 is a diagrammatic representation of well logging apparatus for deriving simultaneous, different indications of formation conductivity; and FIG. 8 is a diagrammatic representation of well logging apparatus for deriving indications of formation conductivity corresponding to a considerable lateral depth of investigation.

Figure 1:
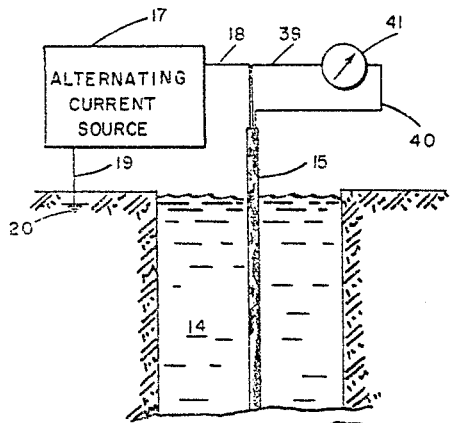
FIG. 1 is a diagrammatic representation of well logging apparatus constructed in accordance with one form of the invention.

In FIG. 1 is shown an elongated, generally cylindrical electrode 10 disposed for movement longitudinally along a borehole 11 which extends from the surface of the earth downwardly through subterranean formations 12 including a permeable formation 13. Contained within the borehole 11 is a column 14 of conductive fluid or electrolyte, such as a water-base drilling mud. The electrode 10 may conveniently be supported in the borehole for movement therethrough by a multiconductor electric cable 15 which may be spooled on a winch (not shown) at the earth's surface.

The surface of the electrode 10 in contact with the conductive fluid is electrically continuous so that a substantially uniform potential may be established along its length. To promote the flow of survey current laterally from the electrode 10 into the adjacent formations, a suitable alternating current source 17 has one terminal connected by a cable conductor 18 to the electrode 10 and its other terminal connected by conductor 19 to a ground point 20. Conveniently, the output of the alternating current source 17 has a regulated potential and a relatively high frequency such as, for example, 10,000 to 100,000 cycles per second. By disposing the current return point 20 remotely from the electrode 10, a flow of survey current laterally into the adjacent formations to a considerable depth is promoted, especially from a central portion 22 of the electrode 10. The flow of survey current from the electrode 10 will tend to vary in magnitude in dependence upon the conductivity of the earth formations traversed, but the total amount of current flow from the electrode is of relatively little significance because the variation in total flow reflects an average of conductivities effectively along a region commensurate with the length of the electrode. Since the electrode 10 may have a length of, say, 10 feet to minimize any vertical component of current flow from the central section 22, indications of the total current flow could not provide a detailed representation of variations in formation resistivity.

In order to provide the desired detail of conductivity indications for purposes such as the accurate delineation of formation boundaries, there are assembled with the electrode 10 a pair of toroidal coils 23, 24 serving to detect the magnitude of ionic current flowing in selected regions proximate to the borehole wall. The coils 23, 24 are orientated with respect to the electrode 22 so that their toroidal axes intersect the axis of the electrode at right angles. The plane of each coil is thus spaced in parallel relation to the axis of the electrode by a distance in the direction of the coil axes which places each coil close to the borehole wall. To ensure accurate, reproducible measurements, the spacing of the coils relative to the electrode is fixed while measurements are obtained, although the coils may be arranged for movement into a collapsed position for ease of handling and speed of travel through the borehole before or after a logging operation.

As shown in FIG. 1, the coils 23, 24 are each supported by upper and lower sets 25, 26 of arms which are pivotally connected to spaced upper and lower collars 27, 28 carried by the electrode 10. Conveniently, upper collar 27 is secured to the electrode 10 so as to have a fixed position, while the lower collar 28 is movable between the position illustrated in FIG. 1 and a lower position to shift the toroidal coils 23, 24 between their extended position and a retracted position. Further upward movement of collar 28 beyond the illustrated position is prevented by stops 29 projecting outwardly from the electrode 10 and by the limitation of further pivotal movement between arms 26 and the coils and collars once the extended position is reached. To prevent the collapse of the coils inwardly toward the electrode lower stops 30 may be arranged to engage the bottom shoulder of collar 28 when the collar is in its uppermost position. While the stops 30 may simply be spring urged outwardly into locking position so that they may be manually released for convenience in handling of the electrode and coil assembly, it may be desirable to provide a solenoid or like means (not shown) for retracting the stops 30 upon remote actuation. To enhance the rigidity of the coil supporting arrangement and ensure movement of the coils to their extended position when the lower stops 30 are retracted, the arms 25, 26 may be spring loaded to urge movement into the extended position. The toroidal coils 23, 24 are conveniently arranged on opposite sides of electrode 10 with their axes coincident.

Figure 2:
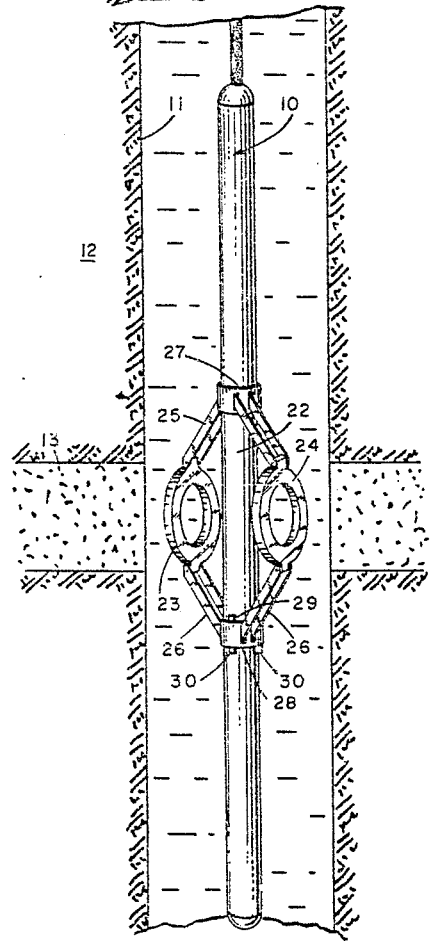
FIG. 2 is a diagrammatic representation of portions of the apparatus of FIG. 1.
Figure 2:
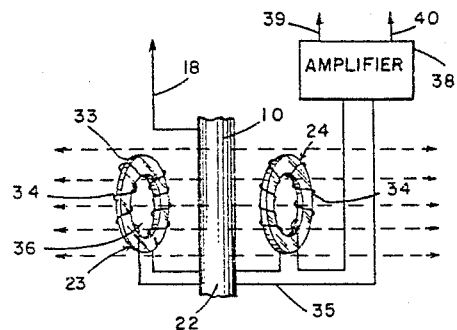

As seen in FIG. 2, each of the toroidal coils 23, 24 includes a toroidal core 33 carrying a helical winding 34, the windings 34 being connected in a series circuit by conductor 35 for addition of the induced potentials. Desirably, the toroidal coils are designed selectively to detect ionic current flow through their central passages and not to respond to stray magnetic fields and capacitively coupled potentials. Accordingly, the toroidal core 33 may be composed of any ferromagnetic material having stable characteristics, although non-magnetic cores may be employed, if desired. The windings 34 may be wound in clockwise layers and cancelling counterclockwise layers, suitable shields being provided to minimize capacitive coupling. For mechanical ruggedness, the coils may be suitably covered as by a bonded casing composed of rubber or other tough insulating material. Such casing, in addition to protecting the coils against mechanical abrasion, serves to augment the insulation of the coil windings.

The signal induced in the winding 34 by the flow of ionic current from electrode 10 through the central passages 36 of the coils is applied to the input terminals of an amplifier 38 which may suitably be tuned to the frequency of the alternating current source 17 and have a constant gain. The output terminals of amplifier 38 are connected by cable conductors 39, 40 to a suitable indicating device 41 at the earth's surface to furnish a measure signal thereto which is an amplified version of the signal induced in the coil windings 34. For purpose of providing a log of conductivity indications as a function of depth of the electrode in the borehole, the indicating device 41 may be a galvanometric recorder of the type commonly employed in well logging. Rectifying means (not shown) may, if desired, be incorporated in the measuring circuit.

In an exemplary operation of the apparatus, the electrode 10 is lowered into the borehole for movement past formations to be investigated. Alternating current from the source 17 is emitted from the electrode 10 and returned at the remote ground point 20. By maintaining the elongated surface of the electrode 10 at a substantially uniform potential with respect to the remote ground point, ionic current emitted from the central section 22 of the electrode has a very slight component along the borehole and a large component directed laterally of the borehole and extending for a considerable radial distance into formations opposite the central section 22 of the electrode 10.

To derive detailed indications corresponding to the variation in formation conductivity along the path of this laterally extending component of current, the toroidal coils 23, 24 are positioned opposite the central section 22 and spaced laterally therefrom to encircle a selected portion of the laterally directed ionic current component. Because the coils are spaced from the electrode section 22 so as to be proximate to the borehole wall, the ionic current flowing through their central passages is almost completely free of any component along the borehole. The induced potential which is supplied to indicating device 41 then varies in accordance with the laterally directed component of ionic current only, such component effectively being restricted to a beam of ionic current passing axially through the central passage 36 of either coil 33 or 34. Because the cross section of this beam is restricted at the borehole wall to the area of the central passage 36, it follows that the signal derived from the toroidal coils represents the conductivity of formations at a precisely defined depth in the borehole. Indications derived in response to the induced signal therefore yield a highly detailed measurement of formation conductivities as a function of depth of the electrode 10 in the borehole.

If desired, one of the toroidal coils, and such as coil 24 may be omitted and in its place there may be substituted a back-up plate resiliently urged against the borehole wall. With such arrangement, close proximity of toroidal coil 23 to the borehole wall is ensured.

Figure 4:
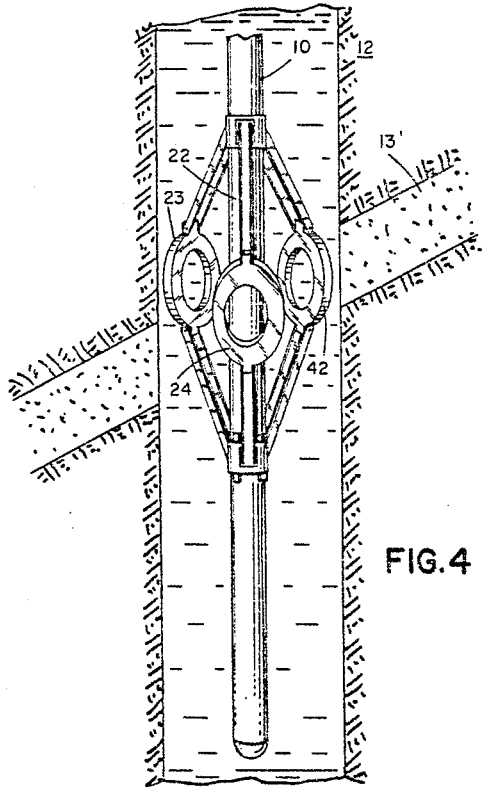
FIG. 4 is a diagrammatic representation of portions of the apparatus of FIG. 3, more particularly showing in elevation the arrangement of the toroidal coils with respect to the elongated electrode.
Figures 3, 5:
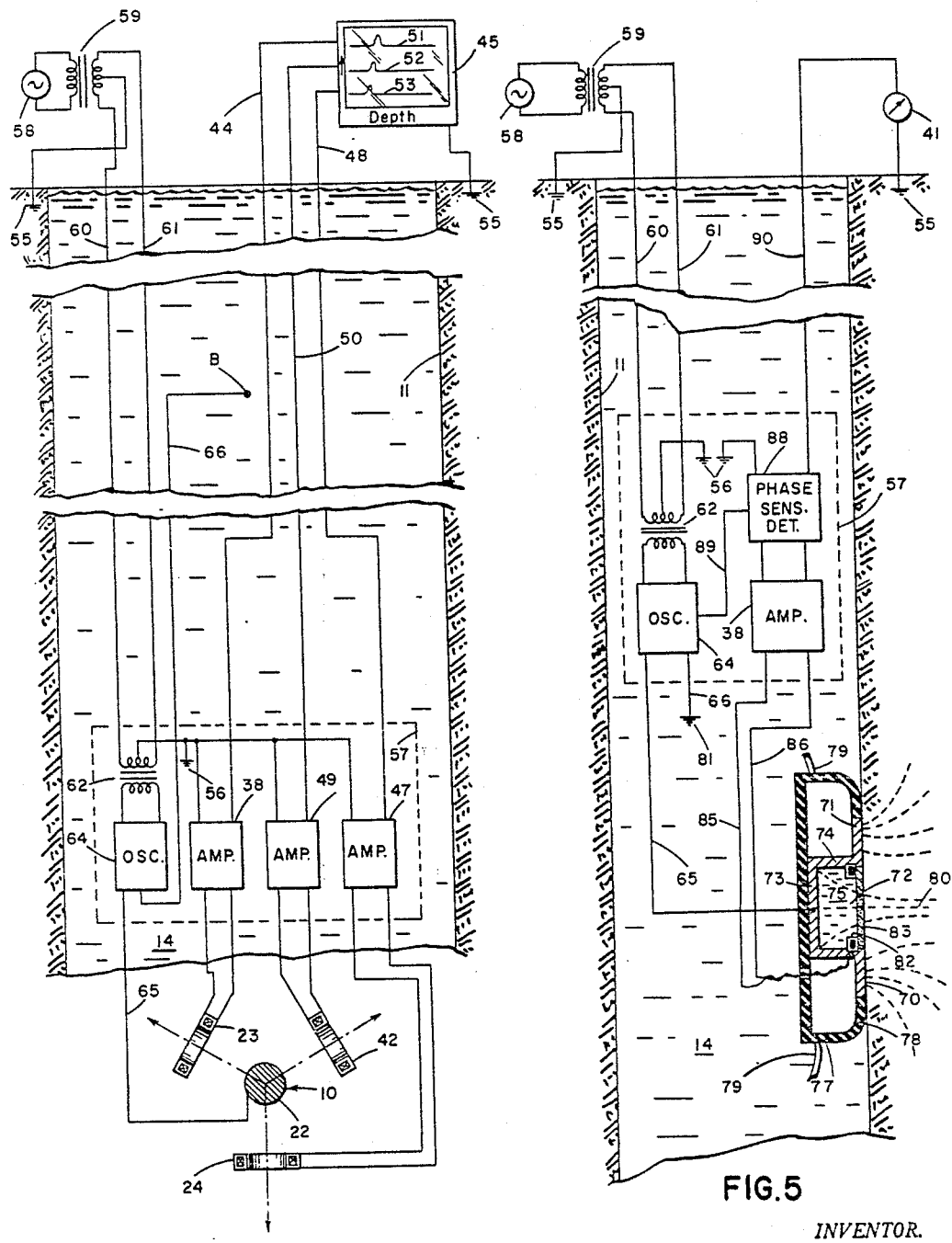
FIG. 3 is a diagrammatic representation of well logging apparatus for deriving indications of formation dip.
FIG. 5 is a diagrammatic representation of well logging apparatus employing an electrode which is urged against the borehole wall.

Referring now to FIGS. 3 and 4, determinations of formation dip may be derived with apparatus constructed in accordance with the invention and including a toroidal coil 42 as well as coils 23 and 24 suitably spaced about the electrode 10. Conveniently, the coils 23, 24 and 42 are spaced about the periphery of central section 22 for the electrode 10 by equal angles of 120° each, the coils being of identical construction and supported by sets of arms similar to those shown and described in connection with FIG. 1. As may be seen in FIG. 4, the beams of ionic current which pass through the respective central passages of the toroidal coils 23, 24 and 42 enter a dipping formation, such as formation 13', at different instants during the movement of electrode 10 through the borehole which are dependent upon the dip.

To correlate the time variations in the potentials induced in the respective toroidal coils as a function of depth, separate measuring circuits are provided for each toroidal coil. Thus, the winding of toroidal coil 23 is coupled to the input of an amplifier 38 which has one of its output terminals connected by cable conductor 44 to a suitable indicating device 45 at the earth's surface. Similarly, toroidal coil 24 is coupled to the input of an amplifier 47 which has one of its output terminals connected by cable conductor 48 to another input terminal of indicating device 45, and toroidal coil 42 is coupled to the input of an amplifier 49 which has one of its output terminals connected by cable conductor 50 to a third input terminal of indicating device 45. Amplifiers 47 and 49 may be identical with amplifier 38 so that the measuring circuits have the same characteristics. To provide recorded indications of the signals simultaneously derived from the three coils, indicating device 45 may suitably be a multiple unit galvanometric recorder, the cable conductors 44, 48 and 50 connecting with separate galvanometer units so as to provide separate curves 51, 52 and 53 representing the signals derived from the corresponding coils 23, 24 and 42. To provide a return circuit for the measure signals, the indicating device 45 is grounded at 55, while an output terminal of each of amplifiers 38, 47 and 49 is connected to a ground point 56 which, together with the amplifiers, is located in a suitable fluid-tight housing 57. A phantom ground return is provided by the power supply circuit between ground points 55 and 56.

More particularly, the power supply circuit includes an alternating current source 58 at the earth's surface coupled by transformer 59 to cable conductors 60, 61. The lower terminals of cable conductors 60, 61 are coupled by a transformer 62 to the input terminals of an oscillator 64 disposed within housing 57. By means of insulated conductor 65, one output terminal of oscillator 64 is connected to electrode 10, while an insulated conductor 66 connects the other output terminal of oscillator 64 to a current return electrode B spaced a remote distance above the electrode 10. By connection of ground point 55 to the midtap of the secondary winding for transformer 59 and connection of ground point 56 to the midtap of the primary winding for transformer 62, the phantom ground return for the measure circuit is provided. If desired, the oscillator 64 may serve to pass a current between electrode 10 and return electrode B having a frequency different from the frequency of source 58 in order that the effect of power frequency pick-up in the measure circuits may be minimized. The potential differences applied by the oscillator between electrode 10 and electrode B may have a regulated value so that the curves 51—53 may be correlated with a suitable scale of formation conductivities.

In an exemplary operation of the dip determining apparatus of FIGS. 3 and 4, electrode 10 is lowered together with the toroidal coils 23, 24 and 42 and the housing 57 into the borehole for movement past formations to be investigated. Oscillator 64 is energized from source 58 to pass alternating current from the elongated electrode 10 into the adjacent formations. As with the apparatus of FIGS. 1 and 2, ionic current emitted from the central section 22 of the electrode 10 flows laterally of the borehole to a considerable depth within the adjacent formations. The portions of this laterally directed current flow to which the respective toroidal coils are responsive may be thought of as three radially directed, focussed beams correspondingly spaced in equal angles about the central section of the electrode.

Accordingly, the curves 51, 52 and 53 provided by the indicating device 45 represent in a highly detailed form the variations of formation conductivity encountered by the respective beams of current. By correlating the depth displacements of corresponding sections of the three curves, values of formation dip may be derived.

In the embodiment of the invention depicted in FIG. 5, indications are derived representing the conductivity of a relatively small volume of the traversed formations underlying the borehole wall. For this purpose, an electrode 70 is provided which is arranged to be urged into direct electrical contact with the borehole wall. The electrode 70 has a face portion 71 contoured for conformance to the borehole wall and extending about a central passage 72. Relieved rearwardly from the face portion 71 and forming a bottom wall for the central passage 72 is a recessed portion 73 of the electrode 70. An annular wall portion 74 of the electrode may serve to connect the face portion 71 and the recessed portion 73 such that the electrode portions are effectively integral and a fluid-tight recess 75 is defined opening through the central passage 72 outwardly of the face portion 71.

The electrode 70 may be supported by an insulating cushion member 77, a resilient annular portion 78 of which surrounds the face portion 71 of electrode 70 and serves to seal with the borehole wall to insulate the electrode from direct communication with the borehole fluid 14. The cushion member 77 may be carried on bowed springs 79 supported on a suitable elongated framework, such as is shown in Doll Patent No. 2,712,629, whereby the resiliency of bowed springs 79 serves to urge the cushion member outwardly toward the borehole wall. Thus, current supplied by oscillator 64 to the electrode 70 is emitted from the face portion 71, the recessed portion 73 and the annular portion 74 of the electrode to follow a path extending into the formations underlying the cushion member 77.

While current may flow directly from the face portion 71 of the electrode into the adjacent formations, the recessed chamber 75 is filled with an electrolyte, such as a salt solution or an electrolytic gel, to provide for ionic current flow between the recessed and annular portions 73, 74 of the electrode and the adjacent formation. Such ionic current flow extends through the central passage and laterally into the adjacent formations to define a focussed beam indicated at 80 emitted centrally of the face portion 71. Since the oscillator 64, in a suitable form, serves to maintain substantially a constant potential between the electrode 70 and a suitable current return point 81 (which may be the elongated supporting framework), the magnitude of the current flowing in the focussed beam 80 varies as the conductivity of the current path traveled by the beam 80. A measure of the current flow in the beam is provided by a toroidal coil 82 supported by the electrode 70 surrounding its central passage 72. Thus, all of the ionic current emitted from the recessed and annular portions 73, 74 of the electrode flow through the central passage of the toroidal coil 82. However, current emitted from the face portion 71 of the electrode, which encircles the toroidal coil 82, cannot pass through the toroidal coil and so cannot effect the potential induced in its winding. The toroidal coil may conveniently have a construction similar to that of coil 23.

Since any changes in the conductivity of the electrolyte contained within the recess chamber 75 would tend to vary the ionic current flowing through the central passage of the toroidal coil, falsely connoting a variation in formation conductivity, a permeable membrane 83 is positioned across the central passage 72 effectively to retain the electrolyte while affording a conductive path for ionic current. Membrane 83 may, for example, be composed of microporous rubber or other suitable material. Provision may be made, if desired, to maintain the electrolyte in the chamber 75 at a slightly greater pressure than that of the well fluid 14 by any suitable means, so that the electrolyte will not be contaminated in the course of a log. To derive a signal representing the conductivity of formation materials along the path of the current beam 80, the winding of toroidal coil 82 is connected by conductors 85, 86 to the input terminals of amplifier 38 in the measuring circuit. The output of amplifier 38 is coupled to the input of a phase-sensitive detector 88 of any suitable design, supplied via conductor 89 with a reference signal from oscillator 64. Cable conductor 90 serves to connect the output of the phase-sensitive detector with the indicating device 41 at the earth's surface.

In an operation of the apparatus in FIG. 5, the cushion member 77 together with the fluid-tight housing 57 is lowered through the borehole 11 for movement past formations to be investigated. Bowed springs 79 maintain the cushion member in conforming contact with the borehole wall whereby a seal is effected between the borehole wall and the annular portion 78 of the cushion member to insulate electrode 70 from a direct electrical contact with the borehole fluid 14.

Oscillator 64 is energized to emit current between electrodes 70 and remote current return point 81 for passage through the formations underlying the face of the cushion member. Since the electrode 70 is electrically continuous, the recessed portion 73, the annular portion 74 and the base portion 71 of the electrode have the same potential with respect to the remote return point 81, which potential is preferably regulated to have a substantially constant value. Due to the small potential drop occasioned by the flow of ionic current through the electrolyte in chamber 75, the absolute potential immediately in front of the membrane 83 is somewhat less than the potential of the face portion 71 of electrode 70. Consequently, the electric field is somewhat convergent in the direction of the axis of toroidal coil 82, resulting in a focussing of the current beam 80 emitted from the recessed electrode portion 73 via membrane 83. Such focussing enhances the detail of conductivity indications derived in response to the potential induced in the toroidal coil 82 and sharpens thereby the delineation of successive formations.

By the use of phase-sensitive detector 88, a rectified version of the signal induced in toroidal coil 82 is obtained which is supplied to the indicating device 41. Device 41 may, therefore, be made responsive solely to D.C. signals and thereby non-responsive to any hum picked up from the power cable conductors 60, 61. In addition, the phase-sensitive detector 88 serves to reject signal components out of phase with the reference signal from oscillator 64, so that any signal components arising from capacitive coupling or the like will not be reflected in the indications afforded by device 41.

If desired, electrode 70 may comprise a plurality of segments conductively interconnected by flexible leads to enhance the flexibility of cushion member 77 thereby to improve its conformance to the irregularities of the borehole wall. It is desirable, however, that the dimensions of the chamber 75 remain fixed in order that the potential drop in the electrolyte may remain constant for a given ionic current flow. It may be observed that the distance which the plane of the toroidal coil 82 is spaced from the recessed portion 73 of electrode 70 is likewise fixed.

There is shown in FIG. 6 another electrode and toroidal coil arrangement which may be substituted for the electrode 70 and coil 82 to obtain conductivity indications of a different character. Alternating current is supplied from oscillator 64 via conductor 65 to an electrode 92 and is emitted into the borehole fluid 14 so as to have components not only laterally of the borehole but also along the borehole. By connecting a relatively high valued resistor 93 in series with the electrode 92, the magnitude of the emitted current may be maintained substantially constant.

Equally spaced on opposite sides of the electrode 92 are toroidal coils 23 and 24 having their axes coincident and extending through the electrode. Axially spaced along the borehole from the electrode 92 a distance equal to the lateral spacing of coils 23 or 24 is a third toroidal coil 95 of similar design. The axis of toroidal coil 95 thus extends axially of the borehole and through the electrode 92, being perpendicular to the axes of coils 23 and 24. Since only a single coil 95 is disposed along the borehole axis while two coils are disposed transversely of it, it is desirable that the coil 95 have twice as many turns as coils 23 and 24. Coils 23, 24 may, however, be shunted by a resistance to equalize the sensitivity to the respective current components. By means of conductors 85 and 86, the windings of toroidal coils 23 and 24 are connected in series aiding relation while the winding of coil 95 is connected in series opposition.

In operation, substantially constant current is emitted from the electrode 92 of FIG. 6. While ionic current flows in all directions from the electrode, coils 23 and 24 are selectively responsive to ionic current flow components directed transversely of the borehole and particularly that ionic current flowing in a beam, the cross section of which is defined by the central passage of either toroidal coil. Similarly, the potential induced in toroidal coil 95 represents the component of ionic current flowing along the borehole and particularly that in a beam, the cross section of which is defined by the central passage of toroidal coil 95. Taking the potential induced in coils 23 and 24 as proportional to a transverse component $i_t$ of ionic current and the potential induced in coil 95 as proportional to an axial component $i_a$ of ionic current, the measure signal supplied via conductors 85, 86 varies as the difference $i_a - i_t$ between the current densities along the axis of the borehole and perpendicular to it. This difference signal, which is supplied to the indicating device 41 in a rectified form, is found to be roughly proportional to the resistivity ratio $R_f/R_m$, where $R_f$ is the formation resistivity along a path extending laterally from the electrode 92 through coils 23, 24 and $R_m$ is the resistivity of the well fluid or drilling mud 14. Since the resistivity $R_m$ of the drilling mud has an ascertainable, generally constant value in a given well, the indications provided by the device 41 are proportional to formation resistivity $R_f$.

In FIG. 7 is shown apparatus constructed in accordance with another form of the invention and serving to delineate permeable formations. The alternating current source 17 is here connected by cable conductors 97 and 98 to upper and lower electrodes 99, 100 spaced apart along the borehole to pass current therebetween and through the adjacent formations. Considering the current paths indicated by dotted lines 101 and 102 as defining the bounds of a first current beam having a shallow penetration of adjacent formations and current paths 103 and 104 as defining the bounds of a second current beam having a deeper penetration, the placement of toroidal coils 105 and 106 is seen to render them selectively responsive to ionic current flow in the first and second beams respectively. While the toroidal coils 105 and 106 may thus be positioned at any point in the borehole athwart the respective beams, they are preferably spaced at equal distances from one of the electrodes, such as electrode 100, and have their axes coplanar with the axial line joining the electrodes 99, 100 but at different angular inclinations with respect to the axial line. If desired, another pair of coils (not shown) may be disposed symmetrically on the opposite side of the axial line from coils 105 and 106, the corresponding windings of the symmetrical pairs of coils being series connected.

As illustrated in FIG. 7, the winding of toroidal coil 105 is connected by cable conductors 107, 108 to the input for one unit of galvanometric recording device 45, while the winding of toroidal coil 106 is similarly connected by cable conductors 109, 110 to the input of another galvanometer unit. The recording device 45 then provides curves 111 and 112 recorded as a representation of formation conductivity at successive depths in the borehole.

In an exemplary operation of the apparatus in FIG. 7, the alternating current source 17 serves to pass current between electrodes 99 and 100 along paths which extend outwardly from the borehole into adjacent earth formations. In toroidal coil 105, which is spaced from electrode 100 at an acute angle relative to electrode 99, a potential is induced representing the magnitude of ionic current flowing in the first beam defined by current paths 101 and 102. This induced potential is supplied as a first signal to the recording device 45 and its variations are represented by curve 111. As shown, curve 111 represents increased values of conductivity opposite the permeable formation 13 due to the invasion of mud filtrate (or other conductive fluid) into a zone through which the first current beam extends. The toroidal coil 106, which is spaced at an obtuse angle from electrode 100 relative to electrode 99, has induced in it a potential representing the magnitude of ionic current flowing in the second beam which is bounded by the more deeply penetrating current paths 103, 104. Curve 112 recorded by device 45 in response to this latter induced potential shows a lower formation conductively encountered by the second current beam than that encountered by the first current beam. This occurs because the second beam traverses a zone lying in a depth zone beyond the borehole wall farther removed than the zone in which the mul filtrate or other invading conductive fluid has its highest concentration. Since invasion of mud filtrate occurs only in permeable formations to produce the separation of curves 111 and 112, such curve separation affords a relatively accurate delineation of permeable formations. In general, the more closely spaced the electrodes 99 and 100, the more accurate and detailed a delineation of permeable formations may be secured.

Referring now to FIG. 8, a well logging system is shown serving to derive indications representative of formation resistivity at a considerable lateral depth of investigation. To obtain these resistivity indications, an alternating current source 17 is connected between remote current return point 20 and a central electrode $A_0$ by conductors 18 and 19, respectively, to pass alternating survey current between electrode $A_0$ and the current return point 20 through adjacent formations. Ionic current emitted from the electrode $A_0$ thus has a component directed laterally of the borehole as well as components along the borehole in opposite directions. To regulate the amplitude of the survey current, high valued resistor 93 is series connected in the current circuit.

Spaced equal distances on opposite sides above and below electrode $A_0$ are toroidal coils 113 and 114, similar to coils 23 and 24, having their axes coincident and extending along the borehole through electrode $A_0$. The windings of the coils 113 and 114 are connected in series-aiding relation to the input of rectifier 115. Cable conductors 39, 40 connecting with the output terminals of the rectifier impress a rectified version of the sum of the potentials induced in these coils upon a variable gain section of an amplifier 116. The variable gain section of this amplifier 116 may be of any suitable form and conveniently affords a relatively large range of gain variations. Conductor 117 supplies the input of amplifier 116 with an excitation signal from source 17. One of the amplifier output terminals is connected by cable conductor 118 to a pair of electrodes $A_1$, $A_2$ spaced symmetrically above and below central electrode $A_0$ for alignment therewith along the borehole. The other output terminal of amplifier 116 is connected to remote ground return point 20, thereby to complete a circuit for auxiliary current emitted from electrodes $A_1$, $A_2$ as a degenerative feedback signal serving to minimize the potential induced in toroidal coils 113, 114. In order that the feedback may be degenerative, the auxiliary current emitted from electrodes $A_1$, $A_2$ is in phase with survey current emitted from electrodes $A_0$.

Indications of formation resistivity along the path traversed by the survey current are derived by means of an indicating device 119 having its terminals connected between the central electrode $A_0$ and ground point 20. Thus, indicating device 119 may be of any type suitable for measuring the potential difference between electrode $A_0$ and ground, and desirably affords a record as a function of depth.

In operation, the electrode array of FIG. 8 is lowered together with toroidal coils 113, 114 as a unit into the borehole for movement past formations to be investigated. A substantially constant A.C. survey current is emitted from the central electrode $A_0$ and passes into adjacent formations as well as along the borehole, returning at the ground point 20. Ionic current flow along the borehole from electrode $A_0$ is detected by the toroidal coils 113, 114, the potentials induced in these coils being added and rectified to produce a D.C. gain control signal representing the total current flow in both directions along the borehole. In order to minimize the components of ionic current along the borehole, thereby to focus ionic current directed laterally of the borehole, the feedback amplifier 116 is made degeneratively responsive to the gain control signal representing current flow along the borehole to supply an auxiliary current to electrodes $A_1$ and $A_2$ acting to reduce the potential induced in coils 113, 114 and to buck or oppose the flow of current from electrode $A_0$ along the borehole.

When the potentials induced in coils 113 and 114 are brought substantially to zero by the opposing flows of auxiliary current, substantially all of the constant survey current emitted from electrode $A_0$ passes laterally in a sheet or beam into adjacent formations. With the survey current constant, the potential of electrode $A_0$ with respect to a remote ground point provides a measure signal representing formation resistivity along a path extending for a considerable lateral distance from the electrode $A_0$. Indications of this formation resistivity are obtained with the indicating device 119 in response to such measure signal.

If desired, conductivity indications may be secured with the apparatus of FIG. 8 by employing toroidal coils disposed similarly to coils 23 and 24 of FIG. 1 on either side of electrode $A_0$ to detect the lateral current flow, the absolute potential of electrode $A_0$ being maintained substantially constant. Alternatively, indications of formation resistivity may be secured by maintaining the survey current constant and detecting the absolute potential with respect to ground of a point in the vicinity of the central electrode $A_0$. In lieu of the variable gain amplifier 116, a high gain amplifier may be provided having the potential inducted in coils 113, 114, supplied to its input and serving to supply auxiliary current to electrodes $A_1$, $A_2$ in phase with the survey current.

While in the several figures, indicating means are shown responsive to a measure signal for providing visual indications of formation resistivity or conductivity, it will be apparent that the measure signal may simply be recorded magnetically or in some other non-visual manner or may be processed as in a computer or the like. Where the employment of alternating current has been described, current of different time varying characteristics such as pulsating D.C. current may be employed.

If desired, the toroidal coils of the several embodiments may have an electrolyte retained in their passages by permeable membranes in the manner described in connection with FIG. 5 to avoid clogging of their passages with non-electrolytic material.

Accordingly, the invention is not to be limited to the embodiments which are illustrated and described but is of a scope defined in the appended claims.

I claim:
1. In apparatus for investigating earth formations traversed by a borehole containing a conductive fluid, the combination comprising an elongated electrode movable through a borehole and having a length greater than the diameter of the borehole, electric source means coupled to said electrode and to a current return point for emitting a time-varying current from said electrode into adjacent earth formations, a toroidal coil having a current flow passage through the central region thereof, this entire central region being spaced apart from a central portion of said electrode for intercepting a selected portion of the current emitted from said electrode, and means coupled to said toroidal coil and responsive to the voltage induced therein by said electrode-emitted current for deriving a signal which is a function of the amount of electrode-emitted current flowing through said passage.

2. In apparatus for investigating earth formations traversed by a borehole containing a conductive fluid, the combination comprising an elongated electrode movable through a borehole and having a length greater than the diameter of the borehole, electric source means coupled to said electrode and to a current return point for emitting a time-varying current from said electrode into adjacent earth formations, a toroidal magnetic core having a coil winding thereon and a current-flow passage through the central region thereof, the core being positioned so that its entire central region is spaced apart from a central portion of said electrode and, thus, so that said core does not encircle said electrode, said central region intercepting a selected portion of the current emitted from the central portion of said electrode, and means coupled to said coil winding and responsive to the potential induced therein by said electrode-emitted current for deriving a signal which is a function of the amount of electrode-emitted current flowing through said passage.

3. In apparatus for investigating earth formations traversed by a borehole containing a conductive fluid, the combination comprising an elongated electrode movable through a borehole and having a length greater than the diameter of the borehole, electric source means coupled to said electrode and to a current return point spaced apart from said electrode for emitting a time-varying current from said electrode into adjacent earth formations, a toroidal coil positioned entirely on one side of and apart from said electrode and having a current-flow passage through its central region which lies along a non-metallic current flow path intermediate a central portion of said electrode and said current return point for intercepting a selected portion of the current emitted by said electrode, and means coupled to said toroidal coil and responsive to the potential induced therein by said electrode-emitted current for deriving a signal which is a function of the amount of electrode-emitted current flowing through said passage.

4. In apparatus for investigating earth formations traversed by a borehole containing a conductive fluid, the combination comprising an elongated electrode movable through a borehole and having a length greater than the diameter of the borehole, electric source means coupled to said electrode and to a current return point for emitting a time-varying current from said electrode into adjacent earth formations, a toroidal coil positioned on one side of and apart from a central portion of said electrode with the plane of the toroid parallel to the longitudinal axis of the borehole for intercepting a selected portion of the current emitted from said electrode and passing into said earth formations, and means coupled to said toroidal coil and responsive to the voltage induced therein by said electrode-emitted current for deriving a signal which is a function of the conductivity along the earth formation path of said selected portion of current.

5. In apparatus for investigating earth formations traversed by a borehole containing a conductive fluid, the combination comprising an elongated electrode movable through a borehole and having a length greater than the diameter of the borehole, electric source means coupled to said electrode and to a current return point for emitting a time-varying current from said electrode into adjacent earth formations, two toroidal coils having their entire central regions spaced apart from a central portion of said electrode in different directions for intercepting two different selected portions of the current emitted from the central portion of said electrode, and means coupled to the respective toroidal coils and responsive to the respective voltages induced therein by said portions of the electrode-emitted current for deriving signals which are a function of the amount of electrode-emitted current flowing through said central regions.

6. In apparatus for investigating earth formations traversed by a borehole containing a conductive fluid, the combination as defined in claim 5, wherein said toroidal coils have their axes transverse to the borehole and directed radially of said electrode surface.

7. In apparatus for investigating earth formations traversed by a borehole containing a conductive fluid, the combination as defined in claim 6, wherein said electric source means produces a substantially constant potential difference between said electrode and the remote current return point, and the signals derived by said means coupled to the toroidal coils represent the conductivity along the path of the selected portions of current.

8. In apparatus for investigating earth formations traversed by a borehole containing a conductive fluid, the combination comprising an elongated electrode movable through a borehole and having a length greater than the diameter of the borehole, electric source means coupled to said electrode and to a current return point for emitting a time-varying current from said electrode into adjacent earth formations, at least three toroidal coils spaced in the direction of their axes laterally from a central portion of said electrode and spaced angularly thereabout, each of said toroidal coils having a current flow passage through the central region thereof for intercepting a selected portion of the current emitted by said electrode, and indicating means responsive to the potentials induced in each of said coils for providing simultaneous indications varying as a function of the conductivity along the paths of the corresponding selected portions of the current emitted by said electrode.

9. In apparatus for investigating earth formations traversed by a borehole containing a conductive fluid, the combination comprising an electrode movable through a borehole and having an exposed surface for emitting current therefrom, support means for urging at least a portion of said exposed surface against the borehole wall, electric source means coupled to said electrode and to a current return point for emitting a time-varying current from said electrode into adjacent earth formations, a toroidal coil having a passage therethrough spaced from a central portion of said electrode surface and containing an electrolyte to provide a conductive path for a selected portion of the current emitted by said electrode, and means coupled to said toroidal coil for deriving a signal which is a function of the amount of current flowing through said conductive path.

10. In apparatus for investigating earth formations traversed by a borehole containing a conductive fluid, the combination as defined in claim 9 wherein said electrode has an annular portion for direct electrical contact with the borehole wall, said central portion being recessed from said annular portion so as to be spaced therefrom and from the plane of said toroidal coil.

11. In apparatus for investigating earth formations traversed by a borehole containing a conductive fluid, the combination comprising an electrode movable through a borehole and having an exposed surface in electrical contact with conductive fluid, electric source means coupled to said electrode and to a current return point for emitting a time-varying current from said electrode into adjacent earth formations, a toroidal coil having a passage therethrough spaced from said electrode surface, a porous membrane closing at least one end of said passage to retain an electrolyte therein which provides a conductive path for a selected portion of current emitted by said electrode, and means coupled to said toroidal coil for deriving a signal which varies as a function of the amount of current flowing through said conductive path.

12. In apparatus for investigating earth formations traversed by a borehole containing a conductive fluid, the combination comprising an electrode movable through a borehole and having an exposed surface in electrical contact with conductive fluid therein, electric source means coupled to said electrode and to a current return point for emitting a time-varying current from said electrode into adjacent earth formations, at least two toroidal coils spaced in the direction of their axes from said electrode by substantially equal distances, the axis of one of said toroidal coils being directed laterally of the borehole and the axis of the other of said coils being directed along the borehole, each of said toroidal coils having a passage therethrough containing conductive fluid to provide a conductive path for a selected portion of the current emitted by said electrode, and means coupled to said toroidal coils and responsive to the difference between the potentials induced therein for deriving a signal which represents the resistivity along the path of the selected portion of current which is directed laterally of the borehole.

13. In apparatus for investigating earth formations traversed by a borehole containing a conductive fluid, the combination comprising a pair of electrodes spaced along the borehole for movement therethrough and having an exposed surface in electrical contact with conductive fluid therein, electric source means coupled to said electrodes for emitting a time-varying current therebetween which passes into adjacent earth formations, at least one toroidal coil spaced in the direction of its axis from one of said electrodes and having a passage therethrough containing conductive fluid to provide a conductive path for a selected portion of the current emitted between said electrodes, and means coupled to said toroidal coil for deriving a signal which is a function of the amount of current flowing through said conductive path.

14. In apparatus for investigating earth formations by a borehole containing a conductive fluid, the combination comprising a pair of electrodes spaced apart along the borehole and movable therethrough, each of said electrodes having an exposed surface in electrical contact with conductive fluid in the borehole, electric source means coupled to said electrodes for emitting a time-varying current therebetween which passes into adjacent earth formations, at least two toroidal coils spaced in the direction of their axes substantially equal distances from one of said electrodes, said axes being differently inclined from a line adjoining said electrodes, each of said toroidal coils having a passage therethrough containing conductive fluid to provide a conductive path for a selected portion of the current emitted between said electrodes, and indicating means coupled to each of said toroidal coils for deriving indications of the variation in conductivity along the paths of the selected portions of said current through the respective toroidal coil passages.

15. In apparatus for investigating earth formations traversed by a borehole containing a conductive fluid, the combination comprising at least two electrodes spaced along the borehole for movement therethrough, each of said electrodes having an exposed surface in electrical contact with conductive fluid, electric source means coupled to one of said electrodes and to a current return point for emitting a time-varying current from said one electrode into adjacent earth formations, at least one toroidal coil spaced in the direction of its axis along the borehole from said one electrode and having a passage therethrough containing conductive fluid to provide a conductive path for a selected portion of the current emitted by said one electrode, means responsive to the potential induced in said toroidal coil for passing auxiliary current between the other of said electrodes and a current return point degeneratively to reduce said induced potential substantially to zero, and means coupled with said one electrode for deriving a signal varying with the resistivity of formations adjacent said one electrode.

16. In apparatus for investigating earth formations traversed by a borehole containing a conductive fluid, the combination comprising a first electrode, second and third electrodes spaced along the borehole above and below said first electrode for movement therewith through the borehole, each of said electrodes having an exposed surface in electrical contact with conductive fluid therein, electric source means coupled to said first electrode and to a current return point for emitting a time-varying current from said first electrode into adjacent earth formations, at least one toroidal coil spaced in the direction of its axis along the borehole near said first electrode and having a passage containing conductive fluid to provide a conductive path for a selected portion of the current emitted by said first electrode, means including a feedback amplifier coupled to said toroidal coil and responsive to the potential induced therein by said selected portion of current for emitting auxiliary current between said second and third electrodes and a current return point degeneratively to reduce said induced potential substantially to zero, and means coupled to said first electrode for producing indications of the resistivity of formations adjacent said first electrode.

17. In apparatus for investigating earth formations traversed by a borehole, the combination comprising electrode means movable through a borehole and having an exposed surface for emitting current therefrom, support means for urging at least a portion of said exposed surface against the borehole wall, electric source means coupled to said electrode means and to a current return point for emitting a time-varying current from said exposed surface into adjacent earth formations, a toroidal coil affixed to said electrode means for intercepting a selected portion of the current emitted by said wall-engaging exposed surface of said electrode means, and means coupled to said toroidal coil for deriving a signal which is a function of the amount of such intercepted current.

18. In apparatus for investigating earth formations traversed by a borehole, the combination comprising an electrode movable through a borehole, support means for urging said electrode against the borehole wall, electric source means coupled to said electrode and to a current return point for emitting a time-varying current from said electrode into adjacent earth formations, a toroidal coil recessed in said electrode for intercepting a selected portion of the current emitted by said electrode, and means coupled to said toroidal coil for deriving a signal which is a function of the amount of such intercepted current.

19. In apparatus for investigating earth formations traversed by a borehole, the combination comprising: a wall-engaging pad member having first and second electrode portions for emitting current from a wall-engaging face thereof and adapted for movement through a borehole; means for urging said wall-engaging face against the borehole wall; means for emitting current from said electrode portions into adjacent earth formations, the current from said second electrode portion serving to constrain the current from said first electrode portion into a focussed beam; a toroidal coil carried by said pad member and encircling the current flow path for the current from said first electrode portion; and means coupled to said toroidal coil for deriving a signal representative of the current from said first electrode portion.

20. In apparatus for investigating earth formations traversed by a borehole, the combination comprising: a wall-engaging pad member having an electrode portion for emitting current from a wall-engaging face thereof and adapted for movement through a borehole; means for urging said wall-engaging face against the borehole wall; means for emitting current from said electrode portion into adjacent earth formations; a toroidal coil carried by said pad member and encircling the current flow path for current from said electrode portion; and means coupled to said toroidal coil for deriving a signal representative of the current flow through said toroidal coil.

References Cited in the file of this patent
UNITED STATES PATENTS

| | | |
|---|---|---|
| 2,333,883 | Piety | Nov. 9, 1943 |
| 2,712,629 | Doll | July 5, 1955 |
| 2,780,781 | Medlar | Feb. 5, 1957 |
| 2,916,691 | Owen | Dec. 8, 1959 |